(12) United States Patent
Berajawala et al.

(10) Patent No.: US 9,703,860 B2
(45) Date of Patent: Jul. 11, 2017

(54) RETURNING RELATED PREVIOUSLY ANSWERED QUESTIONS BASED ON QUESTION AFFINITY

(71) Applicant: International Business Machines Corporation, Armonk, NY (US)

(72) Inventors: Suneil H. Berajawala, Lowell, MA (US); Kevin B. Haverlock, Cary, NC (US); William G. O'Keeffe, Tewksbury, MA (US); David D. Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 14/506,728

(22) Filed: Oct. 6, 2014

(65) Prior Publication Data
US 2016/0098477 A1     Apr. 7, 2016

(51) Int. Cl.
*G06F 17/30* (2006.01)
*G06F 3/0484* (2013.01)
*G06F 3/0482* (2013.01)

(52) U.S. Cl.
CPC ...... *G06F 17/30675* (2013.01); *G06F 3/0482* (2013.01); *G06F 3/04842* (2013.01); *G06F 17/30654* (2013.01); *G06F 17/30705* (2013.01)

(58) Field of Classification Search
CPC .............................................. G06F 17/30654
See application file for complete search history.

(56) References Cited

U.S. PATENT DOCUMENTS

| 5,519,608 A | 5/1996 | Kupiec | |
|---|---|---|---|
| 6,665,841 B1 * | 12/2003 | Mahoney | G06K 9/00463 707/E17.023 |
| 8,055,675 B2 | 11/2011 | Higgins et al. | |
| 8,601,030 B2 | 12/2013 | Bagchi et al. | |
| 2002/0029232 A1 * | 3/2002 | Bobrow | G06F 17/30011 514/534 |
| 2002/0194164 A1 * | 12/2002 | Morrow | G06F 9/4446 |
| 2005/0266387 A1 * | 12/2005 | Rossides | G09B 7/00 434/323 |

(Continued)

OTHER PUBLICATIONS

List of IBM Patents or Patent Applications Treated as Related (Appendix P), 2 pages.

(Continued)

*Primary Examiner* — Mohammad S Rostami
(74) *Attorney, Agent, or Firm* — Stephen J. Walder, Jr.; Diana R. Gerhardt

(57) ABSTRACT

Mechanisms are provided, in a Question and Answer (QA) system, for identifying a related previously processed question. A first question is processed by the QA system to generate an answer to the first question and a supporting evidence passage that supports the answer to the first question being a correct answer to the first question. The QA system performs a lookup operation in a question repository based on an identifier of the supporting evidence passage to identify an entry corresponding to a previously processed question, different than the first question, that previously had an answer generated based on the supporting evidence passage. The QA system returns the previously processed question and the answer to the first question to a submitter of the first question.

18 Claims, 9 Drawing Sheets

(56) References Cited

U.S. PATENT DOCUMENTS

| | | | |
|---|---|---|---|
| 2009/0287678 A1 | 11/2009 | Brown et al. | |
| 2009/0299746 A1* | 12/2009 | Meng | G10L 13/04 704/260 |
| 2011/0066587 A1 | 3/2011 | Ferrucci et al. | |
| 2011/0125734 A1 | 5/2011 | Duboue et al. | |
| 2012/0078891 A1* | 3/2012 | Brown | G06F 17/30654 707/723 |
| 2012/0301864 A1 | 11/2012 | Bagchi et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0297545 A1* | 11/2013 | Bierner | G06Q 50/00 706/46 |
| 2014/0046947 A1 | 2/2014 | Jenkins et al. | |

OTHER PUBLICATIONS

Amaral, Carlos et al., "Priberam's Question Answering System in QA", CLEF, 2007, 7 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages. Dec. 12, 2012.

Toh, Huey L., "Design of a Low-Cost Adaptive Question Answering System for Closed Domain Factoid Queries", The Florida State University College of Arts and Sciences, Dissertation, Feb. 26, 2010, PsycINFO Database Record (c), 2012, APA, 155 pages.

Wan, Qingsheng et al., "Research on Pretreatment of Questions Based on Large-scale Real Questions Set", Journal of Networks, vol. 8, No. 8, Aug. 2013, pp. 1810-1816.

Yuan, Michael J. et al., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

List of IBM Patents or Patent Applications Treated as Related, Sep. 28, 2015, 2 pages.

McCord, M.C. et al., "Deep parsing in Watson", IBM J. Res. & Dev. vol. 56 No. 3/4 Paper 3, May/Jul. 2012, pp. 3:1-3:15.

* cited by examiner

RETURNING RELATED PREVIOUSLY ANSWERED QUESTIONS BASED ON QUESTION AFFINITY

BACKGROUND

The present application relates generally to an improved data processing apparatus and method and more specifically to mechanisms for identifying and returning related previously answered questions to a question posed to a question and answer system based on affinity to an evidence passage.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a Question and Answer (QA) system comprising a processor and a memory, for identifying a related previously processed question. The method comprises processing, by the QA system, a first question to generate an answer to the first question and a supporting evidence passage that supports the answer to the first question being a correct answer to the first question. The method further comprises performing, by the QA system, a lookup operation in a question repository based on an identifier of the supporting evidence passage to identify an entry corresponding to a previously processed question, different than the first question, that previously had an answer generated based on the supporting evidence passage. Moreover, the method comprises returning, by the QA system, the previously processed question and the answer to the first question to a submitter of the first question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
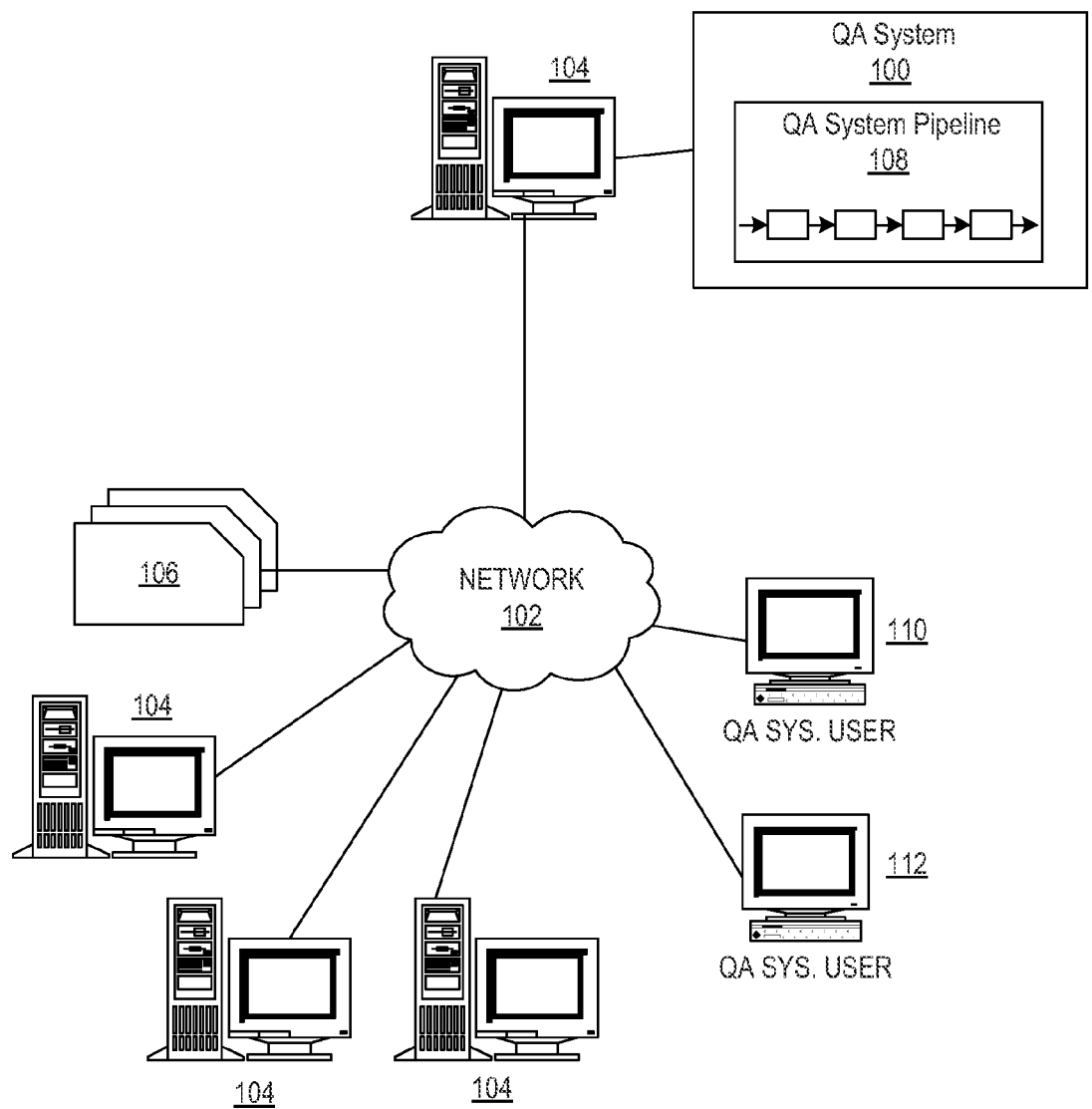
FIG. 1 depicts a schematic diagram of one illustrative embodiment of a question/answer creation (QA) system in a computer network.

The illustrative embodiments provide mechanisms for answering an input question using a Question and Answer (QA) system, such as the IBM Watson™ QA system available from International Business Machines (IBM) Corporation of Armonk, N.Y., and identifying related questions previously processed by the QA system based on affinities of the previously processed questions to the evidence passage (s) used to answer the input question. The impetus for these mechanisms is that it has been recognized that over the course of use, evidence passages that are returned by a QA system as support for an answer to an input question are often reused with a completely different question and often with a different context. Many times, a user asking one question may be interested in other questions different than the posed question but related in that the questions are directed to a similar topic, domain, or area of interest.

For example, consider the question "Where does Manchester United play football?" The supporting documentation in a corpus used by a QA system to answer this question may include a Wikipedia webpage directed to the Manchester United football club, which may contain a wealth of information for answering a myriad of questions other than the one posed, as well as information for answering the posed question. Thus, there may be other information available in this documentation that the user may be interested in but has not asked the right questions for accessing this information via the QA system. Hence, if the user is informed of related questions that have been answered by this documentation, then the user may be able to access additional information that the user has an interest in and may access the answers to these questions to obtain greater insight into the topic, domain, or area of interest.

Using the above example, a related previously answered question, answered using the same documentation, may be of the type "How large is the Old Trafford stadium?" With the mechanisms of the illustrative embodiments, the user may be informed of this related question and may select the question in order to obtain the answer to this question as obtained from the documentation, thereby increasing the knowledge retrieved for this user with regard to the topic, domain, or area of interest. Thus, with the mechanisms of the illustrative embodiments, related previously answered questions that have a high affinity to documentation used to answer a current question may be identified and presented to a user. The questions may be ranked according to their affinities to the documentation such that a ranked listing of these related previously answered questions may be presented to the user in an order according to the rankings, e.g., highest ranked related previously answered question listed first with subsequent related previously answered questions being listed in a descending order of affinity. The entries in the ranked listing are user selectable so that when the user selects an entry, the previously generated answer to the corresponding question is presented to the user. Alternatively, the question may be automatically re-submitted to the QA system to generate a new answer for the related previously answered question selected from the ranked listing.

In a further illustrative embodiment, the identification of related previously answered questions in the manner identified above may be used to generate metrics associated with the documentation to determined improvements to the corpus or corpora housing the documentation. For example, metrics may be calculated and maintained for each of the documentation to indicate whether the documentation is useful in presenting correct answers to questions posed to the QA system or is detrimental to the accuracy of the QA system. These metrics may further be maintained with regard to particular portions of the documentation so as to facilitate informing a provider of the documentation as to ways to improve the documentation for use with the QA system. Based on these metrics, modifications to the documentation may be made, the documentation may be removed from the corpus or corpora, or weights associated with the documentation for use in calculating confidence scores, affinities, and the like, may be adjusted.

Before beginning a more detailed discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

It should be appreciated that the present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
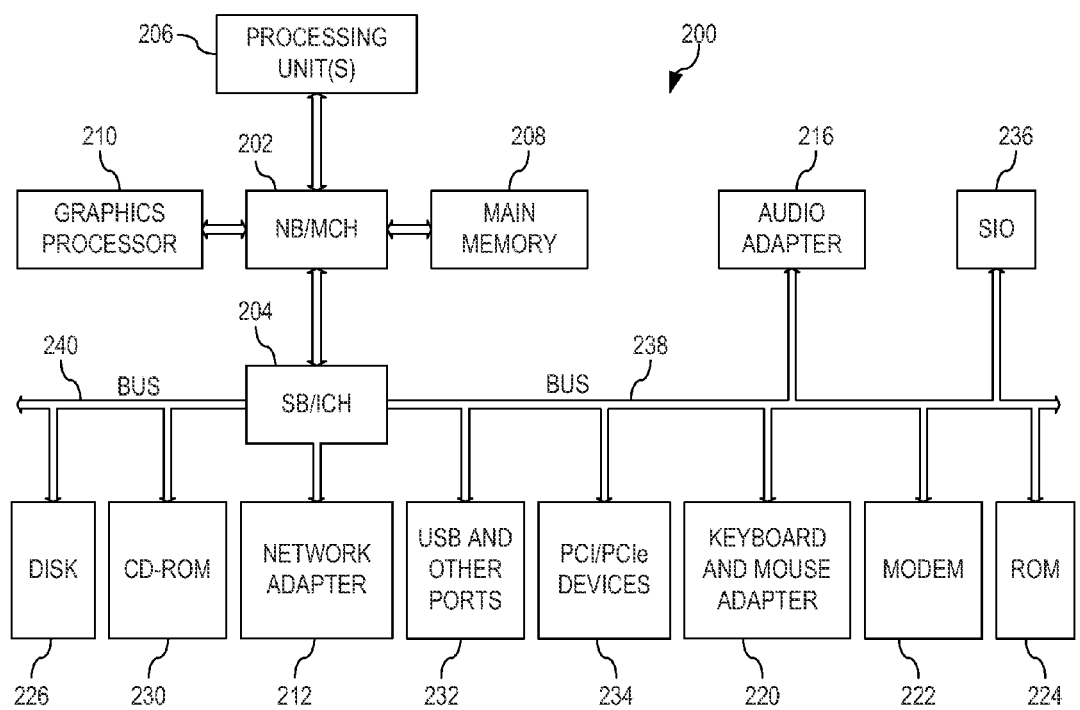
FIG. 2 is a block diagram of an example data processing system in which aspects of the illustrative embodiments may be implemented.
Figure 3:
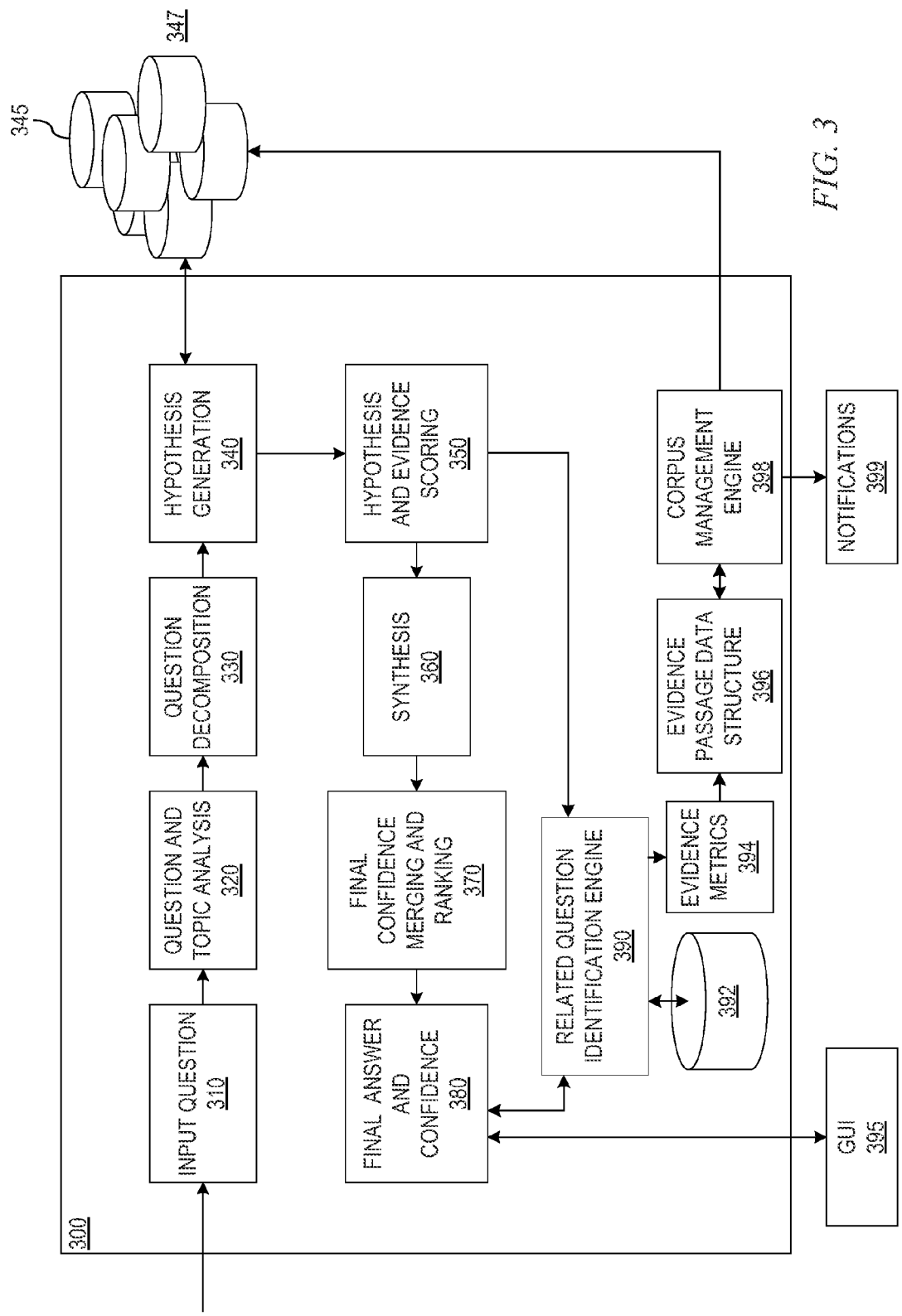
FIG. 3 illustrates a QA system pipeline for processing an input question in accordance with one illustrative embodiment.

The illustrative embodiments may be utilized in many different types of data processing environments but are especially well suited to a data processing environment implemented a Question and Answer (QA) system, such as the IBM Watson™ QA system, for example. Thus, in order to provide a context for the description of the specific elements and functionality of the illustrative embodiments, FIGS. 1-3 are provided hereafter as example data processing environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an QA system, methodology, and computer program product with which the mechanisms of the illustrative embodiments may be implemented. As will be discussed in greater detail hereafter, the illustrative embodiments may be integrated in, and may augment and extend the functionality of, these QA system mechanisms with regard to the identification of related previously answered questions based on affinities of these related previously answered questions with supporting evidence passages, e.g., documents, portions of text, or other information content, in a corpus or corpora of information, used to answer a current question. In addition, mechanisms may be provided for improving the corpus or corpora itself based on the identification of these related previously answered questions and calculated metrics for these related previously answered questions.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA system mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

With particular relevance to the illustrative embodiments, mechanisms are provided in, or associated with, the QA system pipeline 108 to facilitate the identification of related previously answered questions based on affinities of questions to particular documents, portions of text, information content, or the like, in the corpus that are returned as support for an answer to a current question processed by the QA system pipeline 108. For purposes of the following description, the portions of the corpus returned as support for an answer to a current question are referred to herein as supporting "evidence passages" in that they provide evidence in support of the answer being a correct answer for a particular question. It should be appreciated that a single evidence passage may be used as supporting evidence for a plurality of different questions depending upon the information content within the evidence passage, e.g., a Wikipedia webpage may comprise a large amount of information that may answer a large number of different questions directed to a particular topic, domain, or area of interest.

The QA system pipeline 108 may comprise a question repository that links previously processed questions with particular evidence passages, affinity scores calculated between the question and the particular evidence passages, and optionally the answer to question as generated by the QA system pipeline 108 when the question was submitted. When answering an input question using the QA system pipeline 108, the QA system pipeline 108 may return one or more answers to the input question and associated evidence passages that support the particular answers. The identification of the evidence passages may be used as a lookup mechanism for performing a lookup operation in the question repository for related previously answered questions in entries of the question repository that point to the evidence passages. The affinity scores of these related previously answered questions may then be used to rank the related previously answered questions and present the ranked listing to the user along with the answer to the current question. The user may then select a question from the ranked listing to obtain the answer to the selected question and thereby gain greater knowledge of the particular topic, domain, or area of interest. Moreover, metrics may be generated and/or updated based on this identification of related previously processed questions and these metrics may be utilized to improve the corpus or corpora utilized by the QA system pipeline. These operations will be described in greater detail hereafter.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As shown in FIG. 3, in accordance the illustrative embodiments, after stage 380, or as part of stage 380, the QA system pipeline 300 implements a related question identification engine 390 that operates on a question repository 392 to identify previously processed questions that are related to the evidence passage(s) returned as support for the final answer generated in stage 380, each of the candidate answers generated during stage 350, or the like. The identified previously processed questions are ranked and output along with the final answer to the input question 310 in the output graphical user interface (GUI) 395. A user may select an entry in the ranked listing of the GUI 395 in order to obtain the previously generated answer for the corresponding question or have the question corresponding to the entry resubmitted to the QA system pipeline 300 as an input question 310 for processing, and thereby generate a new output GUI, replacing or in addition to GUI 395, with the answer to the re-submitted question.

In addition, metrics 394 associated with the evidence passage(s) returned as support for the final answer may be created and/or updated based on the usage of the evidence passage(s) to support the current answer, the affinity of the evidence passage(s) to related previously processed questions, or the like, and stored in association with the evidence passage as metadata or in a separate evidence passage data structure 396. A corpus management engine 398 may operate on these metrics in the evidence passage metadata or separate evidence passage data structure 396 to determine management operations for modifying the corpus or corpora with regard to the corresponding evidence passage by notifying a provider of the evidence passage of a need to modify the evidence passage, removing the evidence passage from the corpus, modifying a weight value associated with the evidence passage as may be used during confidence measure calculations and affinity calculations, or the like.

In operation, when an evidence passage in the corpus 345 or corpora 347 is accessed as a result of the processing of the input question 310 by the QA system pipeline 300, the QA system pipeline 300 returns a result comprising the evidence passage. In addition, the question, along with the answer and a link or pointer to the supporting evidence passage is stored in the question repository 392. An affinity score is also calculated based on the confidence score associated with the candidate answer generated based on the supporting evidence passage. The affinity score for the passage and question are stored in association with the identifier of the evidence passage and the question in the question repository 392.

The affinity score for a question is a measure of how related a document, providing support for a candidate answer, is to a given question. Not all content in a document is related to a given question. For example, the answer to the question "Where does Manchester United play soccer?" may come from a document or portion of content about "Manchester United" or from a document about "Home stadiums of soccer teams in the UK." In the case of a question of the type "Where does Manchester United play football?," the question has two topics in it, i.e. "where" and "Manchester United." "Where" in this case could be the stadium, town, city, or country and is fairly ambiguous. "Manchester United" is very unambiguous. Thus, as part of a term matching/cluster matching algorithm, "Manchester United" would be the higher weighted topic of the question. Thus, documents that have more concentrated topics around "Manchester United" will have a higher passage affinity score than documents that refer to cities, towns, or soccer stadiums.

Documents may be clustered based on similar topics in a manner generally known in the art of question answering. A lookup operation on these clusters may be performed to identify clusters related to topics in an input question, e.g., clusters associated with "Manchester United" or "Soccer Teams" since it can be deduced from the question that Manchester United is a soccer team. Documents that reside within the identified cluster(s) are given a higher passage affinity score than documents that reside outside the cluster. Moreover, questions associated with a given document or portion of content in the corpus, that have a same lexical answer type (LAT) and focus as information presented in the document are given a higher affinity score.

The affinity score may be calculated using a combination of a plurality of such factors in various ways depending upon the implementation, to calculate a quantifiable measure of the relatedness of a question to a document or portion of content in the corpus that is the source of a candidate answer to the question, and thus an affinity between the question and the candidate answer. For example, the affinity score may be calculated based on a combination of the confidence score associated with the candidate answer, the clustering of documents discussed above, and results of other scoring algorithms including term co-reference scoring, cosine similarity, and the like. In some cases, the affinity scoring algorithm(s) may look at the terms that appear in the input question, synonyms, or other terms associated with the input question, and determine how often they appear in the document or portion of content that is the source of a candidate answer. For example, if a large number of question shave the term "soccer" in them and the document has the term "soccer" in it frequently, then questions about soccer will have a higher affinity score with this document. Terms that are also in the LAT or focus would also be given a higher weight.

Another metric that may be used to calculate the affinity score may be the number of times a given question is asked of the QA system. If the same question is asked often and the same document is returned as the source of a candidate answer to the question frequently and with high confidence and high user ratings, then the affinity score for that document with regard to that question may be increased. As an extension of this, as part of a user feedback mechanism, conversations between the user and the QA system or other users that are the source of such questions may be stored so that it is known what follow up questions different users ask for a given question. In this case, for example, if the question "Where does Manchester United play?" is asked frequently, and the follow up question "When was Manchester United formed?" is often asked in conjunction with the first question, and where both answers are retrieved from the same document, the affinity score for both questions to that document would be increased.

It should be noted that the same document may provide information about a large number of different topics. For example, a document about "Manchester United" may also contain information about "Alex Ferguson." A separate document cluster for "Alex Ferguson" may reference the same document and there may be a large number of questions and follow-up questions directed to "Alex Ferguson," e.g., "What team did Alex Ferguson manage?", "How many titles did Alex Ferguson win as manager of Manchester United?", etc. The affinity scores for these questions may also grow for the same document as the Manchester United related questions discussed above. Of course, there could be any number of different topes in a given document for which separate affinity scores for separate lines of questioning may be generated.

Returning again to FIG. 3, prior to returning the answer and associated supporting evidence passages to the submitter of the input question via the GUI 395, the question repository 392 is accessed and a lookup operation is performed for each of the supporting evidence passages to identify other questions that were previously processed and registered in the question repository 392 that have had answers generated using the same evidence passages used to generate an answer to the current input question 310. A ranked listing of these other related previously processed questions is then generated with the ranking being determined based on a function of the affinity scores associated with the question and the particular supporting evidence passage. The answer to the input question 310 is then returned along with the ranked listing of related questions via GUI 395.

In addition, evidence metrics 394 associated with the evidence passages are updated or created to reflect the usage of the evidence passage in generating answers to input questions 310. For example, a raw count of the number of times that the evidence passage is used to generate a final answer, a candidate answer within a particular range of rankings of the final answer to a question, e.g., within the top 10% of candidate answers, or the like, may be calculated and/or updated based on the results of processing the input question 310 and stored in an evidence passage data structure 396. Moreover user feedback inputs may be received via the GUI 395 to indicate whether the evidence passage is the source of a correct final answer for the input question 310, is identifying an incorrect final answer as if it were a final answer, i.e. is inaccurate, to identify portions of the evidence passage that are inaccurate or need modification, e.g., titles, incorrect facts, ambiguity in the text, etc., and the like. The user feedback inputs may be stored in association with the evidence passage and may be used as a basis for sending notifications 399 to providers of the content of the evidence passages indicating areas where the evidence passages may be improved for use by the QA system pipeline 300. These metrics of evidence passage usage, user feedback, and the like, may collectively be referred to herein as corpus value metrics since they are indicative of the value added by the evidence passage to the corpus in which it is a member.

Furthermore, this corpus value metric information may be used by the corpus management engine 398 to determine whether or not the evidence passage should remain as part of the corpus 345 or corpora 347 or should be removed and operations may be performed to remove the evidence passage from further consideration by the QA system pipeline 300. In addition, weighting values, such as a relevance weight value, may be adjusted for the evidence passage based on the metrics 394 and user feedback. For example, if it is determined that the evidence passage is being used as a basis for correct answers in multiple instances and user feedback indicates that the evidence passage is accurate and a good source of information, then a weight associated with the evidence passage, its source, etc., may be increased. On the other hand, the weight may be decreased if the evidence passage is the source of incorrect answers more often than not and/or if the user feedback indicates the evidence passage to be an inaccurate source. The weights for evidence passages may be stored in metadata associated with the evidence passages themselves, in the evidence passage data structure 396, or the like, and may be used during the calculation of confidence measures and/or affinity scores to adjust the influence the evidence passage has in identifying answers to input questions and/or relevance of the evidence passage to particular questions (as is specified by the affinity score).

Figure 4:
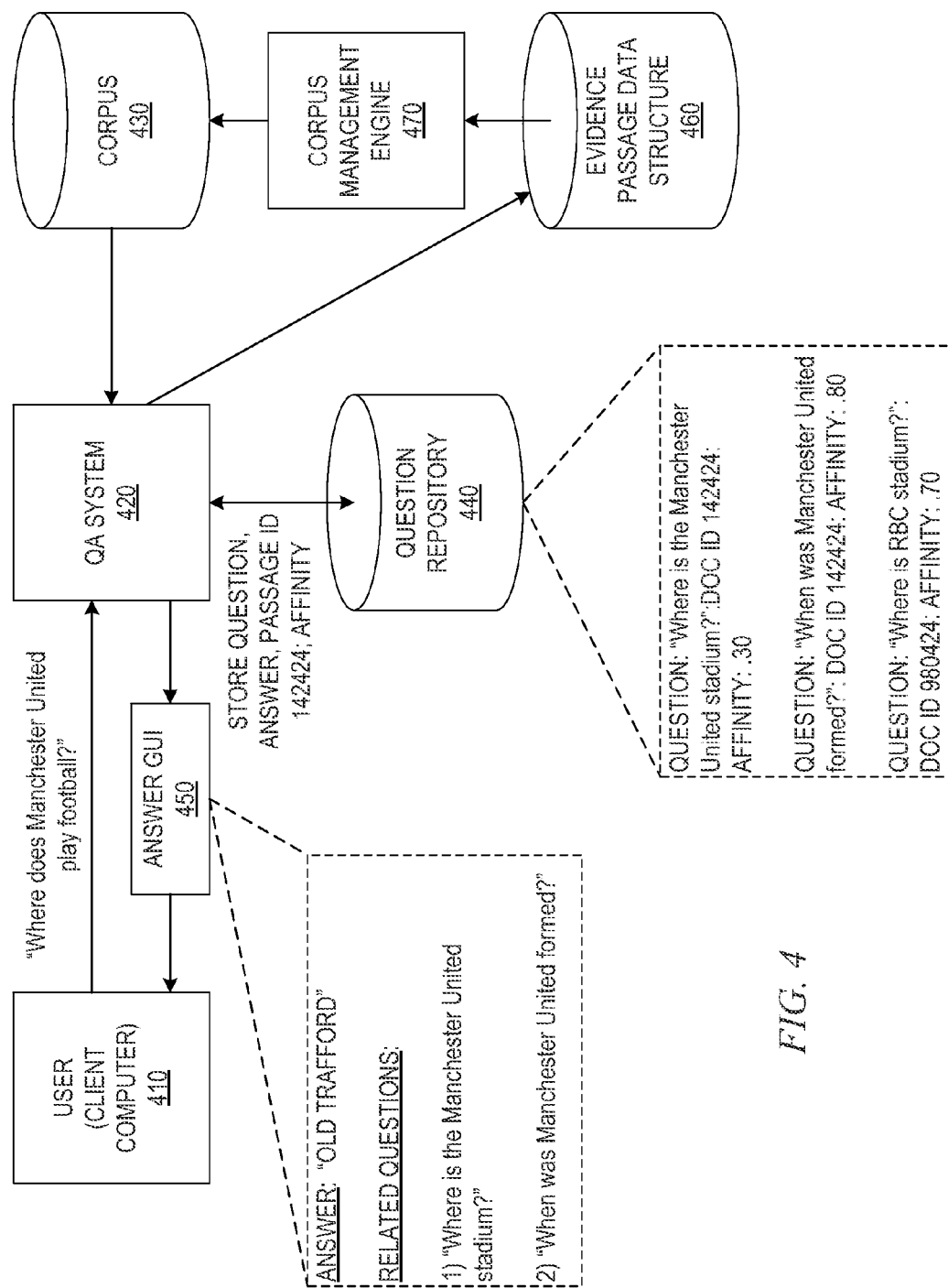
FIG. 4 is an example diagram illustrating a data flow in accordance with one illustrative embodiment.

To further illustrate the operation of the mechanisms of the illustrative embodiments, FIG. 4 is an example diagram illustrating a data flow in accordance with one illustrative embodiment. It is assumed for purposes of the description of this data flow that the QA system 420 has already processed a number of previously submitted questions using the corpus 430 and has registered those questions in the question repository 440 such that they may be retrieved as related previously submitted questions when other questions whose answers are generated from a same evidence passages are processed by the QA system 420.

As shown in FIG. 4, the flow starts with a user 410 submitting a question to the QA system 420. For example, the user 410 may submit such a question by logging onto, or otherwise accessing, the QA system 420 (which may be executing on one or more servers) via the user's client computing device and one or more data networks. In the depicted example, the user 410 submits the question "Where does Manchester United play football?"

In response to receiving the question, the QA system 420 processes the question against the corpus 430 to generate one or more candidate answers, corresponding supporting evidence passage(s) for each of the candidate answers, and a confidence score associated with each of the candidate answers. The calculation of the confidence scores may involve the application of weight values to various factors of the calculation with these weight values being set at least partially based on corpus management operations performed by the mechanisms of the illustrative embodiments based on the usage metrics and user feedback regarding the correctness and usefulness of evidence passages. The candidate answers are ranked according to their candidate answers, and a final answer for the question is generated.

An affinity score is generated for each of the evidence passage(s) that were used to generate the final answer for the question. As mentioned above, the calculation of the affinity score for an evidence passage may be performed in any of a plurality of different ways depending upon the implementation. The affinity score may be any suitable mathematical function that evaluates the relatedness of the question to the evidence passage(s), and thus, the candidate answer generated from the evidence passage(s). For example, the factors already discussed above, e.g., topic cluster affinity, term co-reference scoring, cosine similarity, frequency of occurrence of terms in the question in the evidence passage(s), frequency of returning candidate answers to the same or similar question from the same evidence passage(s), and the like, may all be considered and included in the calculation of the affinity score.

In most cases, the affinity score that is calculated will be for one evidence passage from which the answer was generated. However, in other cases this may involve multiple evidence passages which each contributed to the calculation of the confidence score that resulted in the final answer being ranked highest and selected as the answer to the input question 410.

The question, the final answer, a link or pointer to the supporting evidence passage(s) that generated the final answer, i.e. were a source of the final answer, and the affinity score(s) for the evidence passage(s) are stored in an entry in the question repository 440. In the depicted example, the question "Where does Manchester United play football?" is stored in the entry along with the resulting answer, i.e. "Old Trafford", a pointer to the evidence passage that generated this final answer, i.e. "doc id 142424", and the affinity score, e.g., 90%, indicating the relevance of the evidence passage to this particular question. It should be appreciated that the same evidence passage will have different affinity scores to different questions based on the particular relevance of the evidence passage to that particular question.

The question repository 440 is further searched to find other previously processed questions whose answers were derived from the same evidence passage. That is, the entries in the question repository 440 are searched based on the supporting evidence passage identifier(s) for the final answer to the current question and entries having matching evidence passage identifier(s) are returned as entries corresponding to previously submitted questions that are related to the current question. Thus, in the depicted example, the question repository 440 may store entries for previously submitted questions of "When was Manchester United formed?", "Where is the Manchester United stadium?", and "Where is RBC stadium?" The first two questions have document identifiers for their supporting evidence passages that match the document identifier of the supporting evidence passage for the current question and thus, will be retrieved as related previously processed questions. The third question has a different supporting evidence passage identifier and will not be retrieved as a related previously processed question.

The affinity scores associated with the retrieved related previously processed questions are used to rank the related previously processed questions. In one illustrative embodiment, the highest affinity score value question is listed or ranked first with subsequent listings or rankings of retrieved related previously processed questions being provided in descending order. Other orderings of the retrieved related previously processed questions may be used without departing from the spirit and scope of the illustrative embodiments. The ranked listing of retrieved related previously processed questions may be added to the final answer generated by the QA system 420 for the current question and returned to the user 410, such as via a GUI 450 from which the user 410 may select an entry in the ranked listing and obtain answer information for the corresponding related previously processed question. As mentioned above, the answer information may be obtained from the retrieved entry from the question repository 440 or may be obtained by resubmitting the question to the QA system 420 for processing.

Thus, for example, with regard to the depicted example, not only would the answer "Old Trafford" be returned to the user 410 via a GUI 450, in addition the ranked listing of other related questions is returned as different related questions that the user 410 may be interested in. For example, the questions "Where is Manchester United stadium?" and "When was Manchester United formed?" would be returned in the GUI 450 as well. These questions are listed in order of affinity such that the question "Where is Manchester United stadium?" is listed first due to its affinity value being 80% while the affinity value of "When was Manchester United formed?" is only 30%.

In addition to the above, the QA system 420 may generate metrics for the evidence passage(s) contributing to the selection of the final answer for the input question 410. This may involve, for example, simply incrementing a counter indicative of how many times the evidence passage has been used as a basis for selection of a top ranking answer for an input question. In some illustrative embodiments, a more complex analysis is performed including incrementing counters based on whether the evidence passage supports a high ranking answer or a low ranking answer, user feedback indicating correctness/incorrectness or usefulness/non-usefulness of the final answer, identification of portions of the evidence passage that are more or less correct/incorrect than other portions, and/or the like. The metrics may be stored in metadata of the evidence passage itself, or in association with the evidence passage link or pointer, e.g., document id, in an evidence passage data structure 460, for example. A corpus management engine 470, or corpus management engine 398, may utilize this metadata or evidence passage data structure 460 to periodically perform a management operation on the evidence passages of a corpus to thereby improve the usefulness and accuracy of the corpus 430 with regard to answering questions. This management operation may involve removal of evidence passages from the corpus 430 that have metrics meeting predetermined criteria indicative of the evidence passage being detrimental to the operation of the QA system 420. The management operation may involve modifying weight values associated with evidence passages in the corpus 430 based on a determined usefulness and accuracy of the evidence passage with regard to answering questions by the QA system 420. The management operation may involve sending notifications to providers of evidence passages indicating areas of the evidence passage that may be improved for use with the QA system 420, e.g., title is not completely accurate, summary is missing information from the body of the document, etc. Other corpus management operations may also be performed without departing from the spirit and scope of the illustrative embodiments.

Figure 5A:
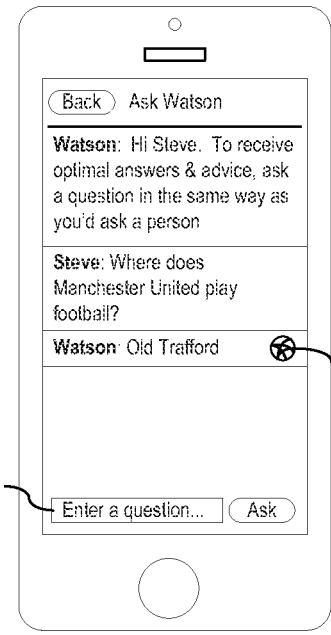
FIGS. 5A-5D are example diagrams of a GUI output that may be generated using the mechanisms of the illustrative embodiments.

FIGS. 5A-5D are example diagrams of a GUI output that may be generated using the mechanisms of the illustrative embodiments. The example diagrams of a GUI output generated by the mechanisms of the illustrative embodiments as show in FIGS. 5A-5D correspond to the example question previously described above, i.e. "Where does Manchester United play football?". In a first screen output of the GUI, as shown in FIG. 5A, a user is presented with a question submission GUI screen in which a field 510 is provided for entry of a question of interest and a field 520 is provided for conveying instructions to the user on how to use the system as well as present information entered by the user and the ultimate answer to the user's entered question. Thus, in this example, the QA system presents instructions to the user informing the user to use natural language to present the question that the user is interested in, repeats the question entered by the user so that the user is given feedback regarding the user's entry into the system, and the final answer is returned. This appears in field 520 as a conversation between the system and the user in a manner similar to that of text chat sessions, online help sessions, or the like. An icon 530 is presented in association with the final answer in field 520 and is selectable by the user to obtain additional information regarding the final answer. In particular, this icon 530 may be selected by the user to obtain display of a GUI depicting the underlying supporting evidence passage(s) leading to the answer generated by the QA system for the input question.

Figure 5B:
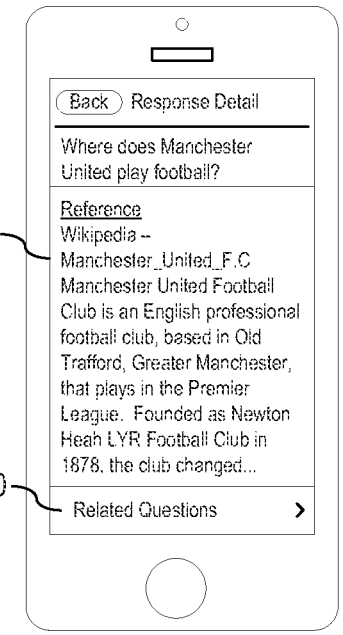

FIG. 5B illustrate an example GUI output illustrating the supporting evidence passage for the question with the answer being highlighted in the text of the supporting evidence passage. As shown in FIG. 5B, the GUI output again reproduces the question followed by the citation to the evidence passage 550, e.g., Wikipedia in the depicted example, with the answer "Old Trafford" highlighted to show where in the evidence passage the answer to the question is found. Of particular note, the GUI output in FIG. 5B further includes a selectable region 540 for obtaining access to the related questions generated by the related question identification engine of the illustrative embodiments. In response to the selection of this region 540, a GUI output such as shown in FIG. 5C may be generated.

Figure 5C:
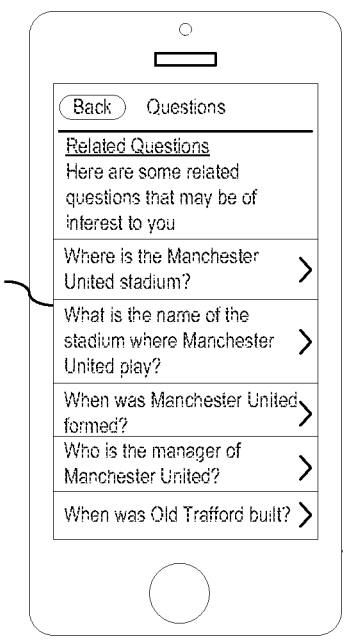
Figure 5D:
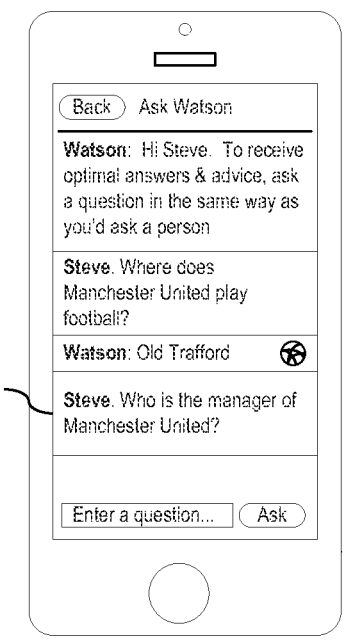

As shown in FIG. 5C, in response to the selection of the region 540 in FIG. 5B, related questions as previously identified by the related question identification engine of the illustrative embodiments may be output in a ranked order listing 560, ranked according to affinity scores measuring the affinity of the related questions to the evidence passage 550 shown in FIG. 5B. Each of the entries in the ranked listing 560 is selectable by the user via the GUI and the user's device to obtain the answer to the selected related question. As shown in FIG. 5D, this results in the GUI in FIG. 5A being updated to reflect the additional question 570 and its corresponding answer. In the depicted example, the answer is generated by resubmitting the question to the QA system and thus, a busy or "working" graphic (shown as multiple circles that in effect pulsate across the display to indicate a "working" state) is displayed until the QA system returns the answer. In other illustrative embodiments, the answer may be immediately available as the previously generated answer for the question rather than resubmitting the question to the QA system for processing.

Thus, the illustrative embodiments provide mechanisms for identifying previously processed questions that are related to a currently processed question based on an affinity of these previously processed questions to an evidence passage used to generate an answer to the currently processed question. A ranked listing of these related previously processed questions may be generated based on their degree of affinity to the evidence passage and may be displayed in a user selectable manner such that additional information with regard to the answers to these related previously processed questions may be accessed by the user. In this way, the user is able to explore other questions of interest that are directed to a similar topic, domain, area of interest, or the like.

Figure 6:
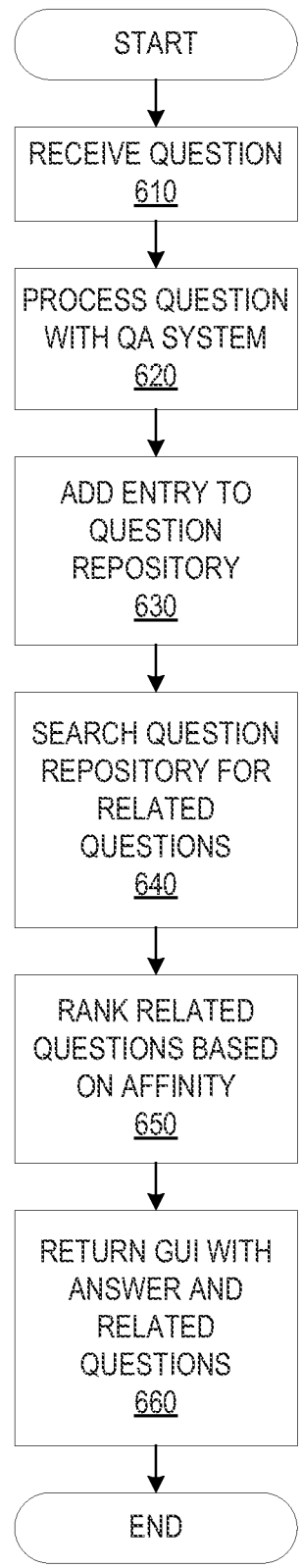
FIG. 6 is a flowchart outlining an example operation of a related question identification engine in accordance with one illustrative embodiment.

FIG. 6 is a flowchart outlining an example operation of a related question identification engine in accordance with one illustrative embodiment. The operation outlined in FIG. 6 is for a single input question and single supporting evidence passage with the identification of related previously processed questions being performed with regard to this single supporting evidence passage. It should be appreciated that this was chosen for simplicity of the description and is not intended to be limiting in any way. To the contrary, the operation outlined in FIG. 6 may be repeated for subsequent questions, multiple candidate answers, and multiple evidence passages.

As shown in FIG. 6, the operation starts with the receipt of an input question for processing (step 610). The question is processed by a QA system to generate a final answer, corresponding supporting evidence passage, and affinity score for the relevance of the supporting evidence passage to the input question (step 620). An entry is added to a question repository for the combination of the question, answer, supporting evidence passage, and affinity score (step 630). The question repository is searched based on an identifier of the supporting evidence passage to identify other previously processed questions that have entries referencing the same supporting evidence passage identifier (step 640). The questions corresponding to any retrieved entries from the question repository are ranked according to their corresponding affinity scores (step 650) and a graphical user interface (GUI) is returned to the submitter of the input question that outputs the final answer to the input question and GUI elements for accessing the related previously processed questions in a ranked listing (step 660). The operation then terminates.

Figure 7:
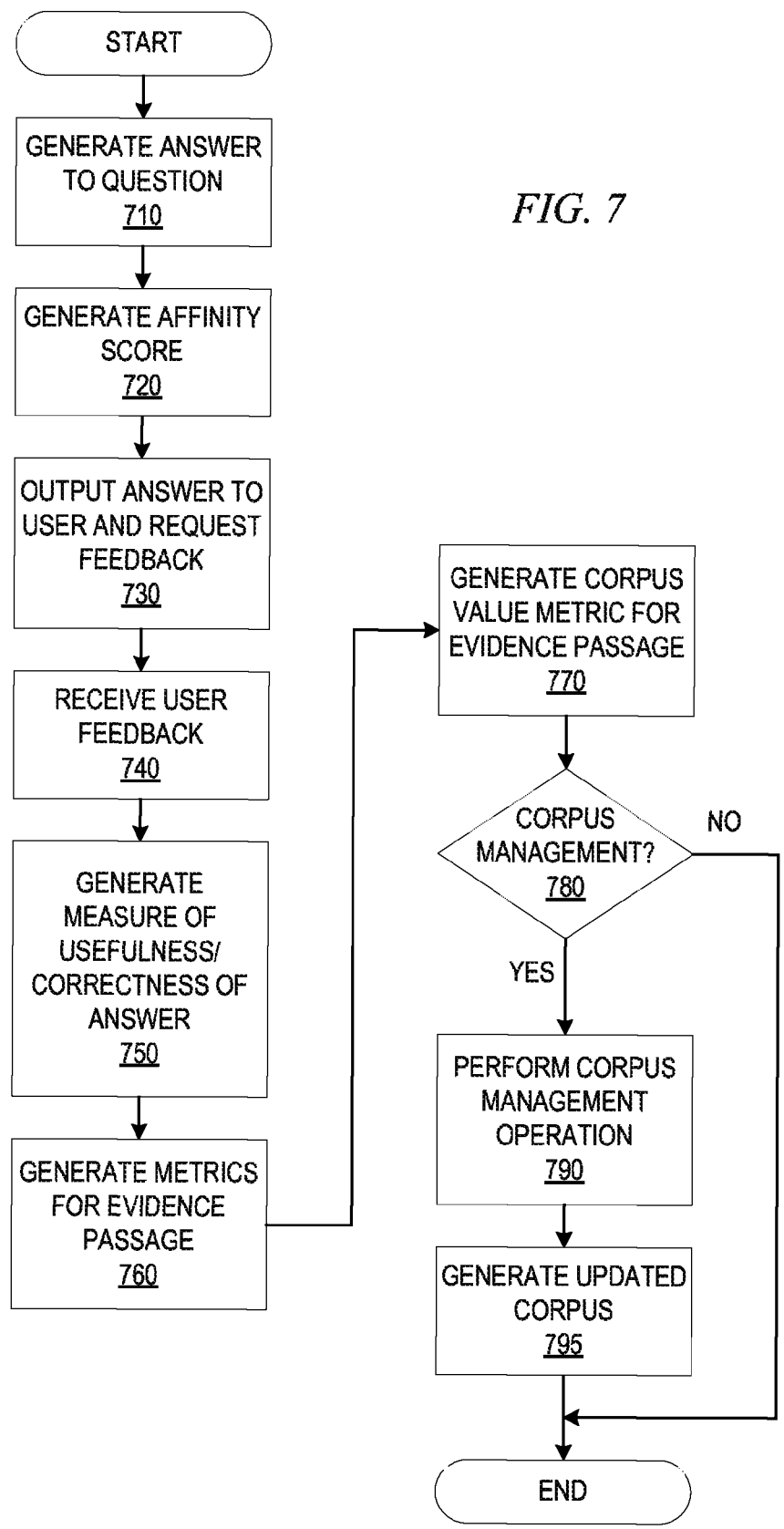
FIG. 7 is a flowchart outlining an example operation of a corpus management engine in accordance with one illustrative embodiment.

FIG. 7 is a flowchart outlining an example operation of a corpus management engine in accordance with one illustrative embodiment. As shown in FIG. 7, the operation starts with the generation of a final answer to an input question by the QA system (step 710). An affinity score between the input question and the supporting evidence passages for the final answer is generated (step 720). The final answer is output to a user via a GUI requesting user feedback as to the usefulness and/or correctness of the final answer for the input question (step 730). The user feedback input is received (step 740) and is used to generate a measure of usefulness and/or correctness of the final answer (step 750). In addition, metrics are calculated based on the number of times the evidence passage has been used to generate a top ranking candidate answer (step 760). The metrics and the measure of usefulness and/or correctness are combined to generate a measure of value of the evidence passage to the corpus (step 770).

If the measure of value of the evidence passage to the corpus equals or falls below a first predetermined threshold or equals or rises above a second predetermined threshold (step 780), then a corpus management operation is initiated (step 790). The corpus management operation may be any operation that elevates the importance within the corpus of the evidence passage if the measure of value exceeds the second predetermined threshold or reduces the importance within the corpus of the evidence passage if the measure of value falls below the first predetermined threshold. The corpus management operation modifies the corpus with regard to the evidence passage to thereby generate an updated corpus (step 795) which is then used by the QA system for future question answering operations. The operation then terminates.

It should be noted that the present invention is not limited to identifying related previously processed questions based on a single supporting evidence passage or for a single final answer to an input question. To the contrary, as mentioned above, the mechanisms of the illustrative embodiments may in fact present a ranked listing of candidate answers to the user that are all potential answers to the input question. In such a case, the mechanisms of the illustrative embodiments may be performed with regard to each candidate answer and with each supporting evidence passage of each candidate answer such that separate ranked listings of related previously processed questions may be generated for each candidate answer and corresponding evidence passage. As a result, if a user were to select any of the candidate answers and drill down to a particular evidence passage, the related previously processed questions for that combination of candidate answer and evidence passage may be accessed.

In addition to the mechanisms described above for identifying related questions to an input question, as noted above, the mechanisms of the illustrative embodiments provide logic and functionality for managing the corpus or corpora which the QA system ingests and operates on to generate candidate answers to input questions. This management may comprise any operation that modifies the corpus or corpora with regard to the evidence passages associated with candidate answers generated for an input question. That is, the QA system may process an input question and generate a set of candidate answers and/or a final answer that is returned to the submitter of the input question. Affinity information, confidence measures, user feedback information, and the like, may be used to determine how well the input question was answered by the various candidate answers and/or final answer as well how useful the evidence passages that are the sources of the candidate answers, or provide supporting evidence for the candidate answers, actually do support the candidate answer as a correct answer for the input question. Based on this information, determinations may be made as to whether to elevate the importance of an evidence passage within the corpus or corpora, reduce the importance of an evidence passage within the corpus or corpora, or even remove the evidence passage from the corpus or corpora if the importance is reduced below a predetermined threshold.

For example, as mentioned above, affinity scores for a document, or evidence passage, are basically a measure of how related the evidence passage (e.g., portion of a document or document as a whole) is to a given question. Thus, for example, two questions asked whose candidate answers are generated from, or supported by, evidence passages in the same document may have different affinity scores with regard to that document. For example, assume that the corpus upon which a QA system pipeline 300 operates is a plurality of informational documents providing descriptions of terms, e.g., a set of Wikipedia documents or the like. One document may provide information about the "Manchester United" soccer club and the club's history while another document may be directed to "Soccer Stadiums and Clubs in the UK." Below is a table illustrating affinity scores for two different example questions using such a corpus having two documents, document A ("Manchester United" document) and document B ("Soccer Stadiums and Clubs in the UK" document):

| Question | Doc A: Manchester United | Doc B: Soccer Stadiums in UK |
| --- | --- | --- |
| What is the home stadium of Manchester United? | Affinity: 80% | Affinity: 90% |
| Who is the manager of Manchester United | Affinity: 90% | Affinity: 50% |

The affinity scores may be calculated in a manner as previously described taking into account various factors depending upon the particular implementation. Thus, in this example, assuming affinity scores are generated at the point in the QA system pipeline 300 where candidate answers are generated, both questions will have returned candidate answers from each of the documents and will have affinity scores calculated for representing a measure of relatedness of the evidence passages (e.g., documents) supporting the candidate answer with the input question. The affinity score can be combined with the existing scoring metrics, e.g., confidence score and/or the like, to not only return a correct answer, but to return a correct answer from an evidence passage or document that is more likely to contain related topics of interest to the user.

As mentioned above, part of the above process is to generate, for each evidence passage, or document, a list of questions with corresponding affinity scores. These affinity scores may be arranged from high to low and may be combined to generate an aggregate affinity score for the evidence passage/document. Thus, not only will an evidence passage have multiple affinity scores, one for each question for which it has generated a candidate answer, but also an aggregate affinity score which represents the overall affinity the document has to questions in general. This aggregate affinity score may be a weighted arithmetic mean, so that an evidence passage that has a single 90% affinity score, for example, would not rank higher than an evidence passage that has a thousand 70% affinity scores.

Since the affinity scores of an evidence passage take into consideration the user feedback and correctness of answers, using this aggregate affinity score allows a corpus management engine, such as corpus management engine 470 or 398, to determine which evidence passages and documents in a corpus or corpora most contribute to correct answers, i.e. evidence passages and documents having a relatively higher aggregate affinity score contribute more to correct answers than evidence passage and documents having a relatively lower aggregate affinity score. Thus, these aggregate affinity scores also may be used by the corpus management engine to identify which evidence passages and documents in a corpus or corpora contribute the least to correct answers. Aggregate affinity scores that are very low relative to the other aggregate affinity scores for other evidence passages or documents, most likely are only contributing wrong answers and are of very little benefit to the overall operation of the QA system.

Various thresholds may be established for identifying aggregate affinity scores indicative of high contribution to correct answers, low contribution to correct answers, and negative contribution to correct answers indicative of primarily wrong answers being returned by the corresponding evidence passage or documents. Thus, through comparison of aggregate affinity values for evidence passages or documents, the corpus management engine may promote the use of evidence passages or documents that are highly contributing to correct answers, reduce the use of evidence passages or documents that are low contributing to correct answers, and remove evidence passages or documents that are primarily providing wrong answers from the corpus or corpora.

It should be appreciated that not only may the affinity scores for evidence passages and documents be aggregated over a plurality of questions associated with that evidence passage/document so as to generate an aggregate affinity score for the evidence passage/document, but the aggregated affinity scores for a plurality of evidence passages/documents in the corpus that are provided by the same source may be aggregated to generate an aggregated affinity score for the source of the evidence passages/documents. In this way, a measure of the contribution of a particular source to the accurate operation of a QA system may be identified and used as a basis for performing corpus management operations by a corpus management engine. For example, if it is determined that a source of evidence passages/documents has a relatively low aggregate affinity score across the various evidence passages/documents provided by that source, then the source may be flagged as an unreliable source and modifications to the corpus or corpora may be performed with regard to evidence passages/documents associated with that source. Moreover, a notification may be generated and output to an administrator or other authorized user to inform them of the low performance of the source's evidence passages/documents so that the user may make determinations as to whether to continue to utilize the evidence passages/documents or not, e.g., renew or discontinue a subscription to the source's evidence passages/documents.

On the other hand, if a source routinely provides high ranking affinity score evidence passages/documents, a user may be informed of this so that the user may determine whether to expand the corpus or corpora with additional evidence passages/documents from that source. Automated corpus management operations may also be implemented for increasing/decreasing weights associated with all evidence passages/documents from a source based on whether or not the aggregate affinity score for the source meets/exceeds/falls below one or more threshold values, or automatically importing additional evidence passages/documents or removing evidence passages/documents to/from the corpus/corpora based on whether the aggregate affinity score for the source meets/exceeds/falls below these one or more threshold values.

In general, it is beneficial to keep the corpus or corpora as small and relevant to the expected questions, i.e. the domain of questions expected to be answered by the corpus/corpora, as possible so as to reduce any noise that may be introduced, stop content from becoming stale, and improve responsiveness of the QA system. Moreover, in a scenario utilizing licensed documents where a customer pays for the privilege to utilize a database of documents as an input corpus to the QA system, situations may arise where a customer is paying a significant amount of money to have certain documents in their corpus that are not, in actuality, providing the benefit for question answering that is expected. Using the aggregate affinity score and corpus management engine of the illustrative embodiments, the corpus management engine may periodically evaluate each of the evidence passages/documents and sources of evidence passages/documents to determine if they are positively impacting the operation of the QA system at a desired level or not. Thereafter, appropriate notifications and/or corpus management operations may be performed by the corpus management engine 398, 470. Such corpus management operations in general may comprise modifying weighting values associated with the evidence passage/document/source, removal of evidence passages/documents, or the addition of additional evidence passages/documents from the source or of a similar nature, i.e. covering the same topics.

The corpus management engine 398 may perform corpus management operations for a particular geographic region or organizational region, e.g., particular departments within a large private or governmental organization. That is, the types of questions being asked by users located in one geographical region may be very different to those being asked by users in another geographical region, or users in one department (e.g., health services department) of a large organization as opposed to users in other departments (e.g., accounting department) of a large organization. For example, questions being asked in the United Kingdom may be about the Manchester United football club while questions coming from the United States may be about the LA Galaxy soccer team. As such, the affinity score for an evidence passage about LA Galaxy would be much higher for a QA system pipeline running in the United States and processing questions from United States users than it would be for a QA system pipeline running in the United Kingdom and processing questions from United Kingdom users.

Assuming a multi-site deployment of QA system pipelines and corresponding corpora, the corpus management engine 398, 470 of a particular site deployment of a QA system pipeline may customize the corpus or corpora for the particular site in which the QA system pipeline and corpus/corpora are deployed. For example, the corpus management engine 398, 470 may remove, or at least reduce the weights associated with, documents about the Manchester United (i.e., documents with relatively low affinity scores) in the United States QA system pipeline instance and may remove documents directed to the LA Galaxy in the United Kingdom QA system pipeline instance. This allows both QA system pipelines to execute on smaller corpora and increase their processing speeds.

Routing mechanisms may be implemented by the QA system for routing questions that are not able to be accurately answered by the particular QA system pipeline in the case that there is a low affinity of documents of the corpus ingested by that QA system pipeline to the question that is input. For example, if a user in the United Kingdom asks the United Kingdom (UK) QA system pipeline a question about the LA Galaxy, the UK QA system pipeline may not be able to answer the question with a high enough confidence due to the corpus having documents with relatively low affinity to questions directed to the LA Galaxy. As a result, the QA system may determine that results generated by the QA system pipeline do not include a candidate answer having a high enough confidence to warrant returning the answer as a valid answer for the input question. Consequently, the QA system may identify another QA system pipeline that operates on a corpus having higher affinity scored documents for the input question in a manner similar to that described above with regard to identifying related questions. That is, the QA system may have access to the question/evidence passage/affinity score mappings for documents in the various other corpora used by other QA system pipelines. From this mapping, a determination of a corpus that contains evidence passages (documents) that have a higher affinity to questions similar to that of the input question may be made and the QA system pipeline utilizing the corpus may be identified. The input question may then be redirected to the identified QA system pipeline for processing and results returned to the original QA system which may then provide them to the submitter of the original input question.

For example, the UK QA system pipeline, seeing that it cannot properly answer the input question due to limitations of the corpus with which it operates, may identify the United States (US) QA system pipeline as using a corpus having documents that have a relatively high affinity with questions similar to that of the input question, and may forward the input question to the US QA system pipeline for processing. The US QA system pipeline operates on the input question and provides the results back to the UK QA system pipeline which then provides the results to the submitter of the original input question. Alternatively, rather than providing results in terms of a set of candidate answers and/or final answer, the US QA system pipeline may instead, or in addition, return the evidence passages that have a high affinity to the similar questions to the input question for inclusion in the evidence passages evaluated by the UK QA system when generating candidate answers. The UK QA system pipeline may then generate a set of candidate answers and/or final answer by processing these additional evidence passages in addition to the evidence passages in the UK QA system pipeline's corpus.

This geographic region or organizational region based corpus management and routing of questions may be extended to individual QA system pipelines in a single site as well. That is, if a QA system implements multiple different QA system pipelines, potentially operating on differently configured corpora, these mechanisms may be used to route questions between QA system pipelines based on which QA system pipeline uses a corpus or corpora with documents having a highest affinity to similar questions. Alternatively, rather than routing the question to another QA system pipeline, the corpus or identified evidence passages/documents of the corpus that have high affinity scores to similar questions, may be ingested for use with the current QA system pipeline in answering the input question.

Thus, as a QA system expands, more QA system pipelines are deployed and more common content (potentially domain specific) is ingested and made available. Therefore, using the affinity scores as a way to find targeted documents to ingest for questions being asked, or routing questions to QA system pipelines based on affinities of evidence passages/documents in their corpora, becomes a significant optimization that allows the QA system to keep the corpus or corpora associated with a QA system pipeline to a minimum size needed to answer questions being asked of that QA system pipeline. That is, the corpus or corpora associated with a QA system pipeline is focused on a minimum size set of evidence passages and documents that are most likely to answer user questions and most likely to have related content/questions of interest to the user.

Figure 8:
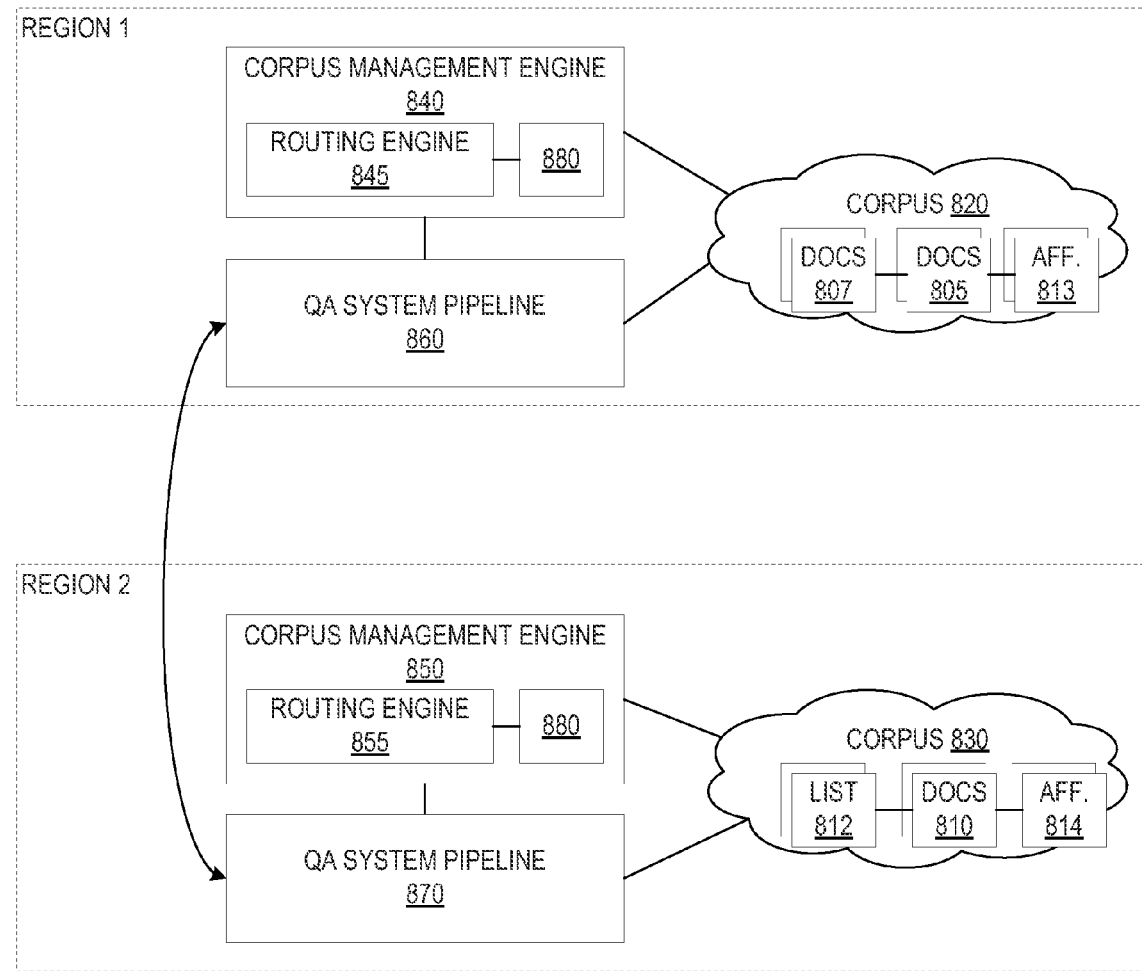
FIG. 8 is an example block diagram illustrating an example operation of a corpus management engine in accordance with one illustrative embodiment.

FIG. 8 is an example block diagram illustrating an example operation of a corpus management engine in accordance with one illustrative embodiment. The operation illustrated in FIG. 8 assumes that documents of the corpora have already been evaluated to generate affinity scores for one or more questions through the above mechanisms of a QA system. Each document 805, 810 in each corpus 820, 830 may thus have associated with it individual affinity scores for questions in a list of questions 807, 812 associated with the document and may further have an aggregate affinity score 813, 814 associated with the document 805, 810. Alternatively, the corpus management engine 840, 850 may generate the aggregate affinity scores 813, 814 for the various documents 810 when performing corpus management operations based on the affinity scores for each of the documents. Moreover, the corpus management engine 840, 850 may generate an aggregate affinity score for each provider or source of documents 805, 810 in the corpora 820, 830 so as to associate an aggregate affinity score with each provider or source of documents.

In the depicted example, the corpus management engines 840, 850 are associated with separate QA system pipelines 860, 870 respectively which may be geographically remotely located from one another or may otherwise handle questions submitted from different sets of users with different types or domains of question interest. In the depicted example, to illustrate the fact that different types of users may submit different types of questions, it is assumed that the QA system pipelines 860 and 870 handle input questions from users located in different geographical regions, however this is not required.

Because the QA system pipelines 860, 870 handle different types of questions with different foci and different answer generation, the corpora 820, 830 are managed so as to modify the relevance weightings of documents, add documents, remove documents, and the like differently in each of the corpora 820, 830 from one another. This is because different affinity scores are generated for documents in the corpora 820, 830 based on the questions handled by the corresponding QA system pipelines 860, 870. Using the example previously mentioned, if QA system pipeline 860 is in the United States and handles questions regarding the LA Galaxy, documents describing the LA Galaxy soccer team will have a higher affinity score than documents describing Manchester United and thus, through corpus management operations by the corpus management engine 840 will be given a higher relative relevance within the corpus 820 than documents directed to Manchester United. However, the opposite may be true for the corpus 830 based on corpus management operations performed by the corpus management engine 850 associated with QA system pipeline 870.

Based on the aggregate affinity scores 813, 814 for the documents 805, 810 in the corpora 820, 830, the corresponding corpus management engines 840, 850 may compare the aggregate affinity scores 813, 814 to predetermined thresholds to determine whether to increase or decrease the relevance weightings associated to thereby promote or demote the documents within the corpus 820, 830 with regard to use in generating candidate answers to questions processed by the corresponding QA system pipelines. Thresholds may further be established for each of the corpus management engines 840, 850 to determine when the aggregate affinity scores are so low as to require removal of a document from the corpus 820, 830. Appropriate operations are performed by the corpus management engines 840, 850, based on results of the comparison of the aggregate affinity score to the various thresholds, to perform such relevance weighting modifications and/or removal of documents from the corpus 820, 830. Notifications of the actions performed by the corpus management engines 840, 850 may be transmitted to computing devices associated with appropriate authorized personnel associated with the QA system pipelines and/or providers of the documents to inform them of the changes made by the corpus management engines 840, 850.

Similar corpus management operations may be performed at a document source level, such that aggregate affinity values associated with a source of documents, as calculated based on an aggregation of aggregate affinity scores of documents provided by that source, are compared to one or more thresholds to determine if the documents provided by that source more often than not contribute to correct answer generation. That is, the aggregated affinity scores for a plurality of documents in the corpus that are provided by the same source may be aggregated to generate an aggregated affinity score for the source of the evidence passages/documents. In this way, a measure of the contribution of a particular source to the accurate operation of a QA system pipeline may be identified and used as a basis for performing corpus management operations by a corpus management engine 840, 850. For example, if it is determined that a source of documents has a relatively low aggregate affinity score across the various evidence passages/documents provided by that source, then the source may be flagged as an unreliable source and modifications to the corpus 820, 830 may be performed with regard to documents associated with that source, e.g., increasing/decreasing relevance weighting values, removal of documents, addition of more documents from the same source, etc. Moreover, a notification may be generated and output to an administrator or other authorized user to inform them of the high/low performance of the source's documents so that the user may make determinations as to whether to continue to utilize the documents or not, e.g., renew or discontinue a subscription to the source's documents, increase the number of documents from the source included in the corpus 820, 830 (e.g., expand a subscription to the source's documents), or the like.

As mentioned above, the corpus management engines 840, 850 may perform corpus management operations for a particular geographic region or organizational region, e.g., particular departments within a large private or governmental organization, or even for just different sets of users, such that the types of questions being asked by users located in one region or set of users may be very different to those being asked by users in another region or set of users. In FIG. 8, a multi-site deployment of QA system pipelines is assumed such that the corpus management engines 840, 850 of a particular site deployment of a QA system pipeline may customize the corpus 820, 830 for the particular site in which the QA system pipeline and corpus 820, 830 are deployed. For example, the corpus management engine 840 may remove, or at least reduce the weights associated with, documents about the Manchester United (i.e., documents with relatively low affinity scores) in the United States QA system pipeline 860 instance and the corpus management engine 850 may remove documents directed to the LA Galaxy in the United Kingdom QA system pipeline instance 870. This allows both QA system pipelines 860, 870 to execute on smaller corpora and increase their processing speeds.

Routing engines 845, 855 may be implemented by the corpus management engines 840, 850 associated with the QA system pipelines 860, 870 for routing questions that are not able to be accurately answered by the particular QA system pipeline 860, 870 in the case that there is a low affinity of documents of the corpus 820, 830 ingested by that QA system pipeline 860, 870 to the question that is input. For example, if a user in the United Kingdom asks the United Kingdom (UK) QA system pipeline 870 a question about the LA Galaxy, the UK QA system pipeline 870 may not be able to answer the question with a high enough confidence due to the corpus 830 having documents with relatively low affinity to questions directed to the LA Galaxy. As a result, the QA system pipeline 870 may determine that results generated by the QA system pipeline 870 do not include a candidate answer having a high enough confidence to warrant returning the answer as a valid answer for the input question. Consequently, the corpus management engine 850 associated with the QA system pipeline 870 may identify another QA system pipeline 860 that operates on a corpus 820 having higher affinity scored documents for the input question in a manner similar to that described above with regard to identifying related questions. That is, the QA system may have access to the question/evidence passage/affinity score mappings 880 for documents in the various other corpora 820, 830 used by other QA system pipelines 860, 870. From this mapping, a determination of a corpus 820 that contains evidence passages (documents) that have a higher affinity to questions similar to that of the input question may be made and the QA system pipeline 860 utilizing the corpus 820 may be identified. The input question may then be redirected to the identified QA system pipeline 860 for processing and results returned to the original QA system pipeline 870 which may then provide them to the submitter of the original input question.

For example, the UK QA system pipeline 870, seeing that it cannot properly answer the input question due to limitations of the corpus 830 with which it operates, may identify the United States (US) QA system pipeline 860 as using a corpus 820 having documents that have a relatively high affinity with questions similar to that of the input question, and may forward the input question to the US QA system pipeline 860 for processing. The US QA system pipeline 860 operates on the input question and provides the results back to the UK QA system pipeline 870 which then provides the results to the submitter of the original input question. Alternatively, rather than providing results in terms of a set of candidate answers and/or final answer, the US QA system pipeline 860 may instead, or in addition, return the evidence passages that have a high affinity to the similar questions to the input question for inclusion in the evidence passages evaluated by the UK QA system pipeline 870 when generating candidate answers. The UK QA system pipeline 870 may then generate a set of candidate answers and/or final answer by processing these additional evidence passages in addition to the evidence passages in the UK QA system pipeline's corpus 830.

This geographic region or organizational region based corpus management and routing of questions may be extended to individual QA system pipelines 860, 870 in a single site as well. That is, if a QA system implements multiple different QA system pipelines 860, 870, potentially operating on differently configured corpora 820, 830, these mechanisms may be used to route questions between QA system pipelines 860, 870 based on which QA system pipeline 860, 870 uses a corpus 820, 830 or corpora with documents having a highest affinity to similar questions. Alternatively, rather than routing the question to another QA system pipeline, the corpus or identified evidence passages/documents of the corpus that have high affinity scores to similar questions, may be ingested for use with the current QA system pipeline in answering the input question.

Figure 9:
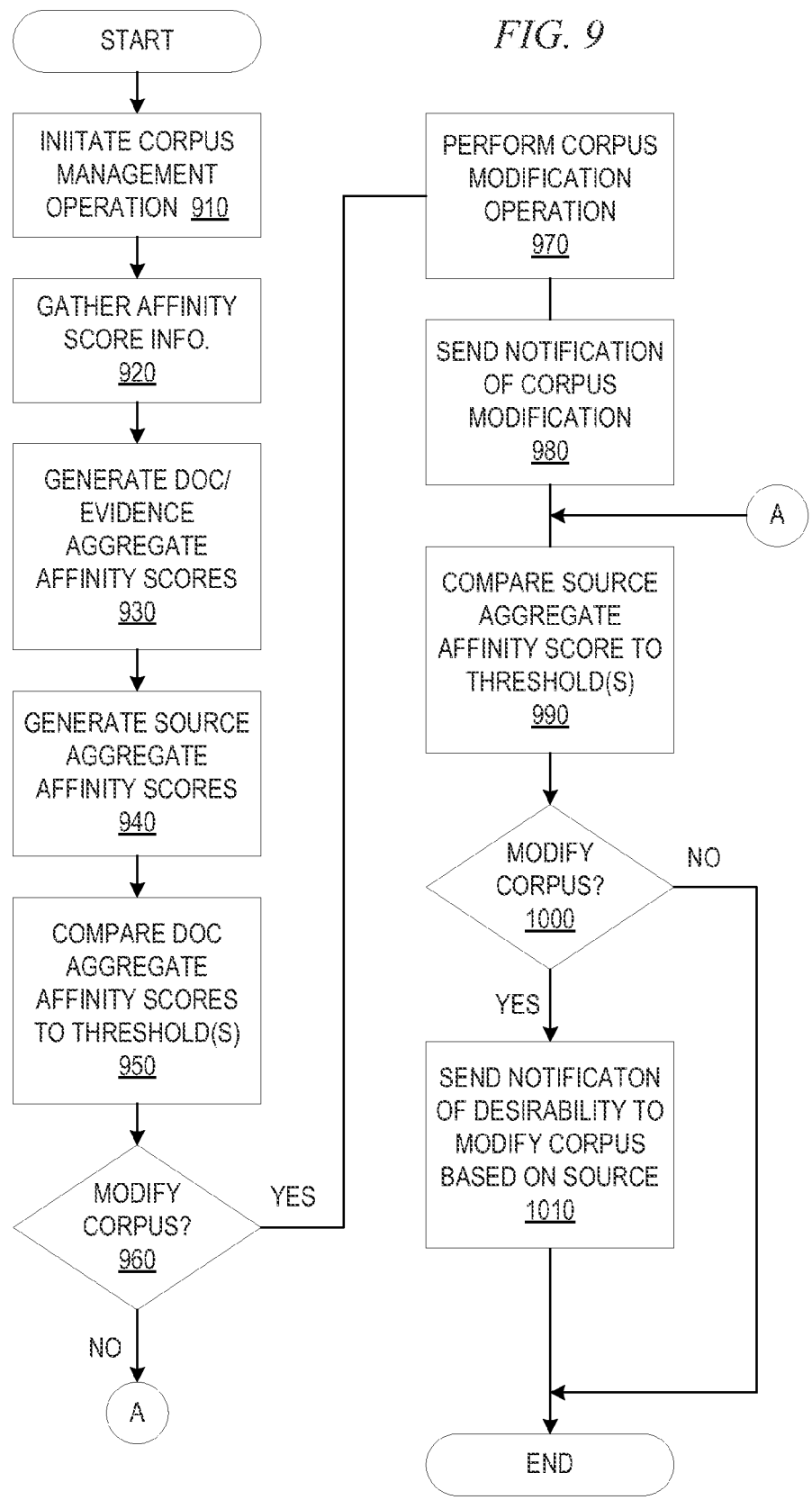
FIG. 9 is a flowchart outlining an example operation for performing a corpus management operation in accordance with one illustrative embodiment.

FIG. 9 is a flowchart outlining an example operation for performing a corpus management operation in accordance with one illustrative embodiment. The operation outlined in FIG. 9 may be implemented, for example, by a corpus management engine associated with a QA system pipeline, such as corpus management engine 840 or 850 in FIG. 8, for example. The operations may be implemented in hardware, software executing on hardware, or any combination of hardware and software executing on hardware.

As shown in FIG. 9, the operation starts with the initiation of a corpus management operation by the corpus management engine (step 910). This initiation of the corpus management operation may be in response to any particular trigger condition or event suitable to the particular implementation. For example, a schedule of corpus management operations may be established and when the time arrives for a next corpus management operation to be performed, the operation is triggered. As another example, a change in affinity values for a predetermined number of documents in a corpus may be used as a trigger condition. As yet another example, a human user may initiate the corpus management operation through an input provided by the human user, such as a command or the like, that is received and interpreted by the corpus management engine as a request to initiate a corpus management operation. Any other triggering event or condition may be used without departing from the spirit and scope of the illustrative embodiments.

The corpus management engine then gathers affinity score information for evidence passages/documents in the corpus or corpora with which it is associated (step 920). The corpus management engine then, for each evidence passage/document, generates an aggregate affinity score for the evidence passage/document based on the gathered affinity score information for the evidence passages/documents (step 930). The corpus management engine, for each source of evidence passages/documents, generates an aggregate score for the source that is an aggregate of the aggregated affinity scores for evidence passages/documents provided by that source (step 940).

The aggregate affinity scores for the evidence passages/documents are compared to one or more thresholds (step 950) to determine if a modification to the relative relevance of the evidence passage/document within the corpus or corpora is to be performed (step 960). If so, the modification is performed (step 970). As noted above, this may involve increase/decreasing a relevance weighting value associated with the evidence passage/document, and/or removal of the evidence passage/document from the corpus or corpora, for example. A notification is sent to one or more authorized personnel to inform them of the modification (step 980).

The aggregate score for the source is compared to one or more thresholds (step 990) to determine if a modification to membership of evidence passages/documents supplied by the source is warranted (step 1000). If so, then a notification is sent to an authorized person to inform them of a desirability to modify the membership of evidence passages/documents supplied by the source (step 1010). As noted above, this may be a modification of membership to reduce or increase the amount of evidence passages/documents used in the corpus or corpora from that source. Alternatively, the modification may be to modify the relevance weightings for all evidence passages/documents supplied by that source.

Thereafter, or if not modifications are determined to be appropriate in steps 960 or 1000, the operation terminates. While FIG. 9 shows the operation terminating, it should be appreciated that the operation may be invoked again at a later time when a corresponding triggering event or condition occurs. In some illustrative embodiments, the operation may be continuously performed so as to continuously perform corpus management operations whenever a change to the affinity scores of one or more evidence passages/documents in the corpus or corpora occurs.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a Question and Answer (QA) system comprising a processor and a memory, for identifying a related previously processed question, the method comprising:

processing, by the QA system, a first question to generate an answer to the first question and a supporting evidence passage that supports the answer to the first question being a correct answer to the first question;

performing, by the QA system, a lookup operation in a question repository based on an identifier of the supporting evidence passage to identify an entry corresponding to a previously processed question, different than the first question, that previously had an answer generated based on the supporting evidence passage;

returning, by the QA system, the previously processed question and the answer to the first question to a submitter of the first question;

calculating, by the QA system, an affinity score of the first question, wherein the affinity score represents an affinity between the first question and the supporting evidence passage; and storing the first question and the affinity score in the question repository in association with the supporting evidence passage, wherein calculating the affinity score of the first question comprises:

clustering one or more topics in the first question;

determining a correspondence of the supporting evidence passage to one or more clusters of the one or more topics in the first question; and calculating an affinity score based on the correspondence, wherein the affinity score is calculated to be relatively higher in response supporting evidence passage being clustered in the one or more clusters than in response to the supporting evidence passage not being clustered in the one or more clusters.

2. The method of claim 1, further comprising:

generating a ranked listing of previously processed questions that previously had an answer generated based on the supporting evidence passage, wherein returning the answer to the first question and the previously processed question to the submitter of the first question further comprises returning the ranked listing of previously processed questions.

3. The method of claim 2, wherein the ranked listing is ranked according to affinity scores of previously processed questions, and wherein the affinity score of a previously processed question identifies an affinity between the previously processed question and the supporting evidence passage.

4. The method of claim 2, further comprising:

receiving a user selection of a previously processed question in the ranked listing of previously processed questions; and in response to receiving the user selection, presenting an answer for the previously processed question to the user.

5. The method of claim 4, wherein presenting the answer for the previously processed question comprises at least one of presenting a stored previously generated answer for the previously processed question or resubmitting the previously processed question to the QA system for processing and generation of the answer that is presented to the user.

6. The method of claim 1, wherein calculating the affinity score of the first question comprises calculating the affinity score of the first question based on one or more of a confidence score associated with the answer to the first question, term co-reference scoring, cosine similarity scoring, and clustering of documents.

7. The method of claim 1, wherein calculating the affinity score of the first question comprises calculating the affinity score of the first question based on at least one of a number of times the first question is processed by the QA system, or a number of times the first question is processed by the QA system and a number of times a follow up question is subsequently processed by the QA system.

8. A method, in a Question and Answer (QA) system comprising a processor and a memory, for identifying a related previously processed question, the method comprising:

processing, by the QA system, a first question to generate an answer to the first question and a supporting evidence passage that supports the answer to the first question being a correct answer to the first question;

performing, by the QA system, a lookup operation in a question repository based on an identifier of the supporting evidence passage to identify an entry corresponding to a previously processed question, different than the first question, that previously had an answer generated based on the supporting evidence passage;

returning, by the QA system, the previously processed question and the answer to the first question to a submitter of the first question;

generating a ranked listing of previously processed questions that previously had an answer generated based on the supporting evidence passage, wherein:

returning the answer to the first question and the previously processed question to the submitter of the first question further comprises returning the ranked listing of previously processed questions, the ranked listing is ranked according to affinity scores of previously processed questions, and the affinity score of a previously processed question identifies an affinity between the previously processed question and the supporting evidence passage; and performing a corpus management operation on a corpus of evidence passages in which the supporting evidence passage is a part based on the affinity scores associated with the evidence passages in the corpus, wherein the corpus management operation comprises at least one of modifying a relevance weight value associated with one or more evidence passages in the corpus, removing an evidence passage from the corpus, or adding additional evidence passages, from a same source as an already existing evidence passage in the corpus, to the corpus.

9. A computer program product comprising a computer readable storage medium having a computer readable program stored therein, wherein the computer readable program, when executed on a data processing system implementing a Question and Answer (QA) system, causes the data processing system to:

process, by the QA system, a first question to generate an answer to the first question and a supporting evidence passage that supports the answer to the first question being a correct answer to the first question;

perform, by the QA system, a lookup operation in a question repository based on an identifier of the supporting evidence passage to identify an entry corresponding to a previously processed question, different than the first question, that previously had an answer generated based on the supporting evidence passage;

return, by the QA system, the previously processed question and the answer to the first question to a submitter of the first question;

calculate, by the QA system, an affinity score of the first question, wherein the affinity score represents an affinity between the first question and the supporting evidence passage; and store the first question and the affinity score in the question repository in association with the supporting evidence passage, wherein the computer readable program further causes the data processing system to calculate the affinity score of the first question at least by:

clustering one or more topics in the first question;

determining a correspondence of the supporting evidence passage to one or more clusters of the one or more topics in the first question; and calculating an affinity score based on the correspondence, wherein the affinity score is calculated to be relatively higher in response to the supporting evidence passage being clustered in the one or more clusters than in response to the supporting evidence passage not being clustered in the one or more clusters.

10. The computer program product of claim 9, wherein the computer readable program further causes the data processing system to:

generate a ranked listing of previously processed questions that previously had an answer generated based on the supporting evidence passage, and wherein the computer readable program further causes the data processing system to return the answer to the first question and the previously processed question to the submitter of the first question further at least by returning the ranked listing of previously processed questions.

11. The computer program product of claim 10, wherein the ranked listing is ranked according to affinity scores of previously processed questions, and wherein the affinity score of a previously processed question identifies an affinity between the previously processed question and the supporting evidence passage.

12. The computer program product of claim 10, wherein the computer readable program further causes the data processing system to:
receive a user selection of a previously processed question in the ranked listing of previously processed questions; and
in response to receiving the user selection, present an answer for the previously processed question to the user.

13. The computer program product of claim 12, wherein the computer readable program further causes the data processing system to present the answer for the previously processed question at least by one of presenting a stored previously generated answer for the previously processed question or resubmitting the previously processed question to the QA system for processing and generation of the answer that is presented to the user.

14. The computer program product of claim 9, wherein the computer readable program further causes the data processing system to calculate the affinity score of the first question at least by calculating the affinity score of the first question based on one or more of a confidence score associated with the answer to the first question, term co-reference scoring, cosine similarity scoring, and clustering of documents.

15. The computer program product of claim 9, wherein the computer readable program further causes the data processing system to calculate the affinity score of the first question at least by calculating the affinity score of the first question based on at least one of a number of times the first question is processed by the QA system, or a number of times the first question is processed by the QA system and a number of times a follow up question is subsequently processed by the QA system.

16. A data processing system comprising:
a processor; and
a memory coupled to the processor, wherein the memory comprises instructions which, when executed by the processor, cause the processor to:
process a first question to generate an answer to the first question and a supporting evidence passage that supports the answer to the first question being a correct answer to the first question;
perform a lookup operation in a question repository based on an identifier of the supporting evidence passage to identify an entry corresponding to a previously processed question, different than the first question, that previously had an answer generated based on the supporting evidence passage;
return the previously processed question and the answer to the first question to a submitter of the first question;
calculate an affinity score of the first question, wherein the affinity score represents an affinity between the first question and the supporting evidence passage; and
store the first question and the affinity score in the question repository in association with the supporting evidence passage, wherein the instructions further cause the processor to calculate the affinity score of the first question at least by:
clustering one or more topics in the first question;
determining a correspondence of the supporting evidence passage to one or more clusters of the one or more topics in the first question; and
calculating an affinity score based on the correspondence, wherein the affinity score is calculated to be relatively higher in response to the supporting evidence passage being clustered in the one or more clusters than in response to the supporting evidence passage not being clustered in the one or more clusters.

17. A computer program product comprising a computer readable storage medium having a computer readable program stored therein, wherein the computer readable program, when executed on a data processing system implementing a Question and Answer (QA) system, causes the data processing system to:
process, by the QA system, a first question to generate an answer to the first question and a supporting evidence passage that supports the answer to the first question being a correct answer to the first question;
perform, by the QA system, a lookup operation in a question repository based on an identifier of the supporting evidence passage to identify an entry corresponding to a previously processed question, different than the first question, that previously had an answer generated based on the supporting evidence passage;
return, by the QA system, the previously processed question and the answer to the first question to a submitter of the first question;
generate a ranked listing of previously processed questions that previously had an answer generated based on the supporting evidence passage, wherein:
returning the answer to the first question and the previously processed question to the submitter of the first question further comprises returning the ranked listing of previously processed questions,
the ranked listing is ranked according to affinity scores of previously processed questions, and
the affinity score of a previously processed question identifies an affinity between the previously processed question and the supporting evidence passage; and
perform a corpus management operation on a corpus of evidence passages in which the supporting evidence passage is a part based on the affinity scores associated with the evidence passages in the corpus, wherein the corpus management operation comprises at least one of modifying a relevance weight value associated with one or more evidence passages in the corpus, removing an evidence passage from the corpus, or adding additional evidence passages, from a same source as an already existing evidence passage in the corpus, to the corpus.

18. A data processing system comprising:
a processor; and
a memory coupled to the processor, wherein the memory comprises instructions which, when executed by the processor, cause the processor to:

process a first question to generate an answer to the first question and a supporting evidence passage that supports the answer to the first question being a correct answer to the first question;

perform a lookup operation in a question repository based on an identifier of the supporting evidence passage to identify an entry corresponding to a previously processed question, different than the first question, that previously had an answer generated based on the supporting evidence passage;

return the previously processed question and the answer to the first question to a submitter of the first question;

generate a ranked listing of previously processed questions that previously had an answer generated based on the supporting evidence passage, wherein:
  returning the answer to the first question and the previously processed question to the submitter of the first question further comprises returning the ranked listing of previously processed questions,
  the ranked listing is ranked according to affinity scores of previously processed questions, and
  the affinity score of a previously processed question identifies an affinity between the previously processed question and the supporting evidence passage; and perform a corpus management operation on a corpus of evidence passages in which the supporting evidence passage is a part based on the affinity scores associated with the evidence passages in the corpus, wherein the corpus management operation comprises at least one of modifying a relevance weight value associated with one or more evidence passages in the corpus, removing an evidence passage from the corpus, or adding additional evidence passages, from a same source as an already existing evidence passage in the corpus, to the corpus.

* * * * *